Sept. 27, 1932.  F. E. GRUNWALDT  1,879,932
COMBINATION FURNACE
Filed July 18, 1928  2 Sheets-Sheet 1
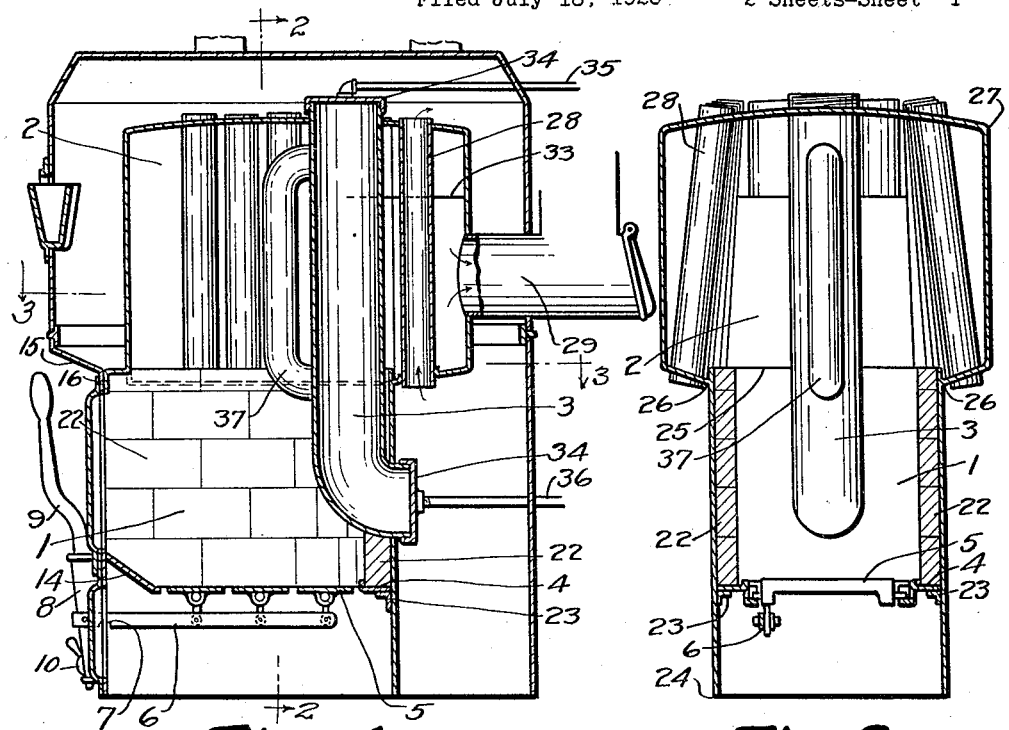
Fig. 1  Fig. 2
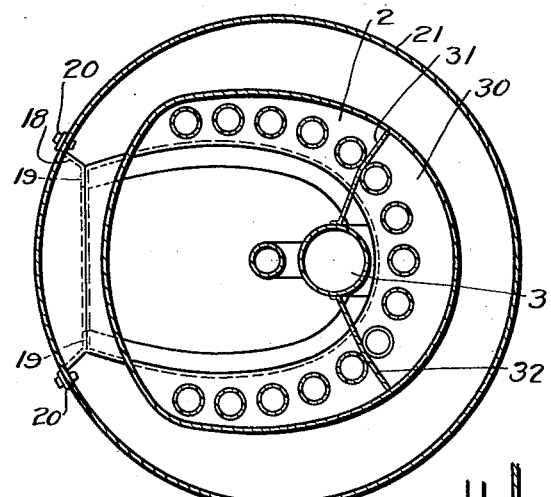
Fig. 3
Fig. 4
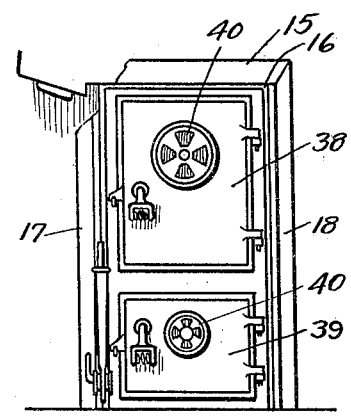
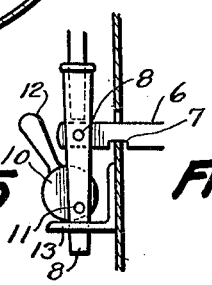
Fig. 5
INVENTOR
Frank E. Grunwaldt
BY
Harry Bowen
ATTORNEY Sept. 27, 1932.  F. E. GRUNWALDT  1,879,932
COMBINATION FURNACE
Filed July 18, 1928  2 Sheets-Sheet 2

INVENTOR
Frank E. Grunwaldt
BY Harry Bowen
ATTORNEY

Patented Sept. 27, 1932

1,879,932

UNITED STATES PATENT OFFICE

FRANK E. GRUNWALDT, OF SEATTLE, WASHINGTON

COMBINATION FURNACE

Application filed July 18, 1928. Serial No. 293,775.

The invention is an electric welded steel plate furnace having a plurality of inclined vertical passages in the walls of a heat extraction chamber above the firebox and a central auxiliary heating chamber in the firebox and which is so arranged that fluids of a high temperature may be supplied by the central chamber and at the same time fluids in the surrounding main heating chamber, which would have a comparatively lower temperature may also be withdrawn.

One object of the invention is to provide a furnace with vertical interior passages which are not in direct contact with the firebox.

Another object of the invention is to provide a furnace having a plurality of heating compartments embodied therein in which some of the compartments are positioned so that they will have a higher temperature than others and so that fluids of different temperatures may be supplied by the respective compartments.

Another object of the invention is to provide a furnace having means for supplying heating fluids at different temperatures.

Another object of the invention is to provide a furnace which is capable of supplying a combination of both hot air and hot water.

Another object of the invention is to provide a furnace having an auxiliary chamber therein in which the auxiliary chamber is readily interchangeable so that either hot water or hot air may be heated therein.

A further object of the invention is to provide a furnace having vertical passages through the interior thereof in which the vertical passages are positioned above the firebox and inclined inward at the top to bring the hot air toward the center.

A still further object of the invention is to provide a furnace in which the furnace front is readily constructed of iron plates provided in sections and the entire furnace made of plates electrically welded.

And a still further object of the invention is to provide a furnace having separate chambers adaptable to heat a plurality of fluids to different temperatures and which is of a comparatively simple and economical construction.

With these ends in view the invention embodies an electric welded steel plate furnace having a firebox, an offset at the upper end of the firebox forming a heat extraction chamber above the firebox, a plurality of inwardly sloping tubular passages extending from the offset through the heat extraction chamber to the top of the furnace, an inner auxiliary heating chamber within the said firebox adaptable to open into the main heating chamber within the outer shell or to have passages directly connected to it, and suitable burners or grates.

Other features and advantages of the invention will appear from the following description taken in connection with the drawings, wherein:—

Figure 1 is a longitudinal section of a furnace with a grate for coal, showing inlet and outlet pipes to the auxiliary chamber so that hot water may be provided in the auxiliary chamber and hot air in the surrounding jacket.

Figure 2 is a cross section through the furnace on line 2—2 of Figure 1 with the outer jacket omitted.

Figure 3 is a sectional plan view through the furnace on line 3—3 of Figure 1 below the stack opening.

Figure 4 is a view of the furnace front.

Figure 5 is a detail showing means for raising the shaker bar.

Figures 6, 7:
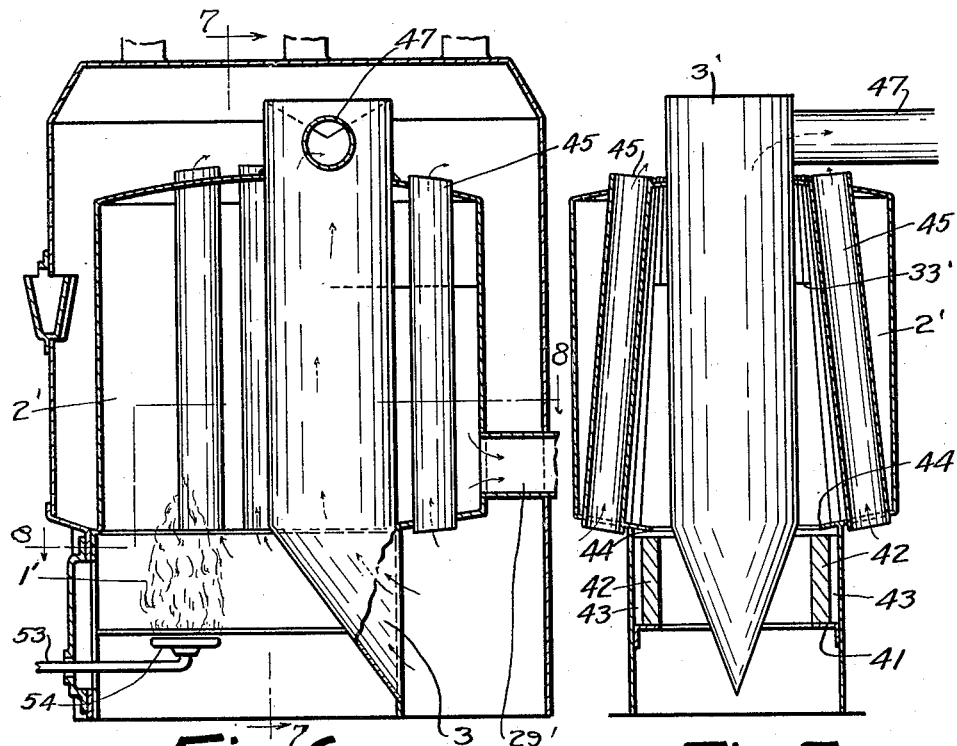
Figure 6 is a longitudinal section through a form of furnace which is adaptable for burning gas.
Figure 7 is a cross section through the furnace on line 7—7 of Figure 6 with the outer jacket omitted.

In the drawings the furnace is shown as it would be made, wherein numeral 1 indicates the firebox, numeral 2 a heat extraction chamber above the firebox and numeral 3 an interior auxiliary heating chamber.

Figures 8, 9:
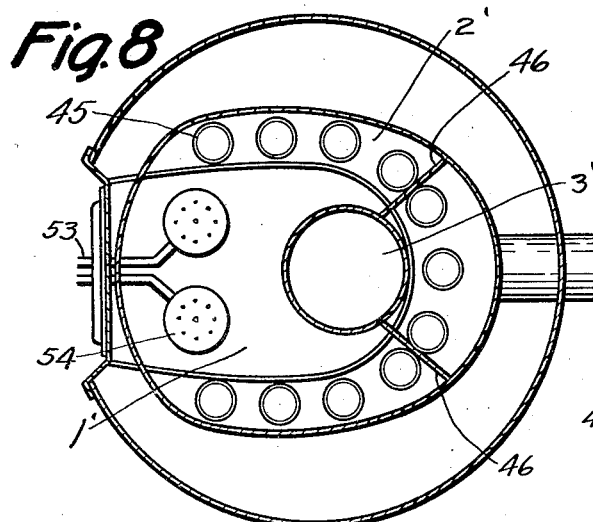
Figure 8 is a sectional plan of the furnace on line 8—8 of Figure 6.
Figure 9 is an elevation of the furnace shown in Figure 6.

In the design shown in the drawings the fire box 1 is made of a somewhat elliptical shape as shown in Figures 3 and 8 with one flat end that is attached to the furnace front. In the design shown in Figure 1 the lower part of the firebox is provided with a flat plate 4 having grate bars 5 rotatably mounted in the downwardly extending projections and attached to a shaker bar 6 which extends through the furnace front and which is provided with a notch 7 to hold the grate in the closed position. The outer end of the bar 6 is attached to a member 8 having a handle 9 in the upper end and having a cam 10 pivotally mounted on the lower end with a pin 11. The cam 10 is provided with a handle 12 and is positioned to engage a clip 13 through which the lower end of the member 8 passes as shown in Figure 5. It will be observed that as the handle 12 is moved downward the cam 10 will raise the member 8 and the bar 6 so that the notch 7 will move upward and disengage the furnace front or door frame by which it may be held as shown, and when it is raised the shaker bar may readily be operated to shake the grates. The plate 4 is inclined upward at the front as indicated by the numeral 14 so that fuel may be placed thereon and so that the ash-box is readily accessible through the lower door. In this design the furnace front is formed with a bent plate 15 at the top having a downwardly extending flange 16 to which the upper end of the door frame is attached and side plates 17 and 18 having flanges 19 at the inner ends to which the sides of the door frame are connected and flanges 20 at the ends to which the edges of the housing 21 may be bolted. It will be observed that the door frame practically forms a furnace front and the plates 15, 17 and 18 are merely connected between the housing and the door frame. In this design the firebox is lined with firebrick as indicated by the numeral 22 which is placed upon the plate 4, and the plate 4 is supported on clips 23 in the lower part of the furnace. It will be noted that the lower part of the furnace extends from the point 24 at the bottom to point 25 at the top and the walls are lined with firebrick from the grate plate 4 to the point 25.

The heat extraction chamber 2 is formed directly above the firebox with the bottom thereof connected to the firebox walls at the point 26 and sloping upward therefrom. It will be observed that this portion of the chamber between the point 25 and the point 26 will fill with ashes which will protect the joints between the tubes and bottom of the chamber. The side walls extend upward to the point 27 and the top is slightly curved as shown.

Tubular members 28 are placed through this heat extraction chamber as shown with the lower ends connected in the bottom and the upper ends sloping toward the center to bring the heated air toward the center of the space above the chamber 2. Sloping the tubular members 28 inward also provides greater space between the upper ends of the tubes and the outer wall so that a greater circulation will be produced. It will be noted that the rear of the chamber 2 is comparatively wide so that a smoke pocket is provided behind the tubes which will permit smoke to readily pass out of the passage 29 through a smoke chamber 30 at the rear. The smoke chamber is formed by baffle plates 31 and 32 which extend from the wall of the chamber 2 to the sides of the auxiliary chamber 3 as shown in Figure 3 and upward to the point 33 as shown in Figure 1.

In the design shown in Figures 1 to 3 the auxiliary chamber 3 is formed of a tubular member as shown with the upper end extending through the top of the chamber 2 and the lower end bent at right angles and extending backward through the rear of the firebox. Both ends are threaded and provided with closures 34 to which pipes 35 and 36 may be connected. The pipes 35 and 36 may extend from the furnace to radiators or other means for transmitting the heat from hot water and the pipe 35 may be used to convey the water to the radiator and the pipe 36 to return the water to the auxiliary chamber. It is understood that this chamber may be of any suitable type or design and may be arranged in any suitable manner and also that the closures may be omitted so that it will form an air passage to increase the temperature of the air in the outer jacket or the upper end may be connected by a larger pipe so that air at a comparatively higher temperature than that of the air in the outer jacket may be conveyed to a special room or a room at a considerable distance from the furnace. The auxiliary chamber may be provided with smaller chambers as indicated by the numeral 37 which may be of any suitable size or design and arranged in any suitable manner.

In this design the furnace front is provided with an upper door 38 through which the fuel is placed into the furnace and a lower ash door 39 as shown in Figure 4, both of which may be provided with ventilators 40 as shown. It is understood, however, that the doors may be made of any suitable design and arranged in any suitable manner.

Figure 10:
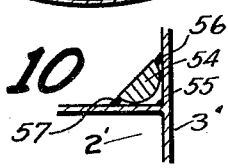
Figure 10 is a detail showing a typical connection by which the auxiliary chambers are welded to the firebox.

The furnace shown in Figures 6 to 9 is particularly adaptable for burning gas and the firebox is provided with a ring 41 upon which firebrick, as indicated by the numeral 42, are placed as shown with an air space, as indicated by the numeral 43, behind them so that sweat from the metal will dry up therein. The bottom of the upper chamber 2' extends beyond the upper end of the firebox wall to the point indicated by the numeral 44 and condensation from the walls of this chamber will run across the bottom and drip upon the upper end of the firebrick so that it will also dry up. In this design the chamber 2' is provided with tubes 45 which are similar to tubes 28 and which are arranged in a similar manner. It will be noted that in both cases the tubes in the rear are substantially vertical and all of the tubes are equally spaced with the exception of two tubes adjacent the rear which are spaced together to hold the baffle plates 31 and 32 in the design shown in Figure 1 and the baffle plate 46 in the design shown in Figure 6. In this design shown in Figures 6 to 9 the auxiliary chamber 3' is provided with a conical opening at the lower end through the rear of the firebox and the upper end is shown extending above the top of the chamber 2' so that tubes 47 may extend from the sides thereof though the furnace jacket to convey hot air to rooms at remote points or rooms in which it is desired to have a higher temperature. It is understood however, that in this design the auxiliary chamber 3' may be replaced with the auxiliary chamber of the furnace shown in Figure 1 so that it may be used for hot water and also so that the chamber shown in Figure 1 may be used in the design shown in Figure 6. In this design the furnace front is also formed of three plates 48, 49 and 50 to which the door frame 51 is attached and in this design the furnace is provided with two doors and the inner edges of the doors are provided with openings 52 through which feed pipes 53 may pass to supply gas to the burners 54. It is understood, however, that these feed pipes may be arranged and connected to the burners in any suitable manner and may be used with any suitable type of burners. The detail shown in Figure 10 illustrates a method of connecting the upper wall of the auxiliary chamber 3' to the top of the chamber 2' wherein a half-round as indicated by the numeral 54, is used so that three separate and distinct welds may be made at the points 55, 56 and 57.

In either design the housing 21 completely incloses the furnace forming a main heating chamber into which the tubes 28 and 45 open at both ends, and as hereinbefore described hot air may be taken from the housing and also from the auxiliary chamber by separate means so that air at different temperatures may be utilized. A water pan 58 may be placed in the front of the housing as shown in Figures 1 to 6.

It will be understood that other changes may be made in the construction without departing from the spirit of the invention. One of which changes may be in the design or the arrangement of the firebox, another may be in the shape, design or location of the auxiliary heating chamber, another may be in the arrangement of the vertical tubes, another may be in the shape or design of the housing, another may be in the use of a grate of a different type and still another may be in the use of other means whereby both water and air may be heated in a furnace.

The construction will be readily understood from the foregoing description. To use the device the furnace may be provided for coal or the like as shown in Figure 1 or for gas or the like as shown in Figure 6 and it will be observed that as the fire burns the heat will pass upward around the tubes and a rapid circulation of air will pass through the tubes passing from the lower part of the furnace to the top and as the tubes are inclined the heated air will pass toward the center of the furnace. The inclined tubes provide considerable space around their upper ends so that the heat from the fire may circulate completely around them which will give the furnace a higher degree of efficiency. The auxiliary chamber 3 may be provided as shown in either Figures 1 or 6 and it may be opened at both ends so that it will merely cooperate with the other tubes to raise the temperature of the air in the main heating chamber around the furnace or the upper end may be closed so that the hot air from the auxiliary chamber which will have a higher temperature may be used to heat a special room or a room at a considerable distance from the furnace or both ends of the auxiliary chamber may be closed and provided with pipe connections, so that it may be used for heating water which would make it possible to heat part of a building with hot water or steam and part with air, thereby providing a combination furnace adaptable to supply both hot water and hot air or hot air at a high temperature and also other air at lower temperatures.

As the tubes are positioned in the heat extraction chamber above the firebox they do not come into direct contact with the fire and the entire firebox may be lined with firebrick so that all metal parts are at a distance from the fire so that they will not come in contact with or be directly affected by the fire which will increase the life of the furnace materially.

Having thus fully described the invention, what I claim as new and desire to secure by Letters Patent, is:—

1. In a heating furnace of the type having a firebox, the combination of a main heating chamber surrounding the firebox and a heat extraction chamber above the firebox, and an auxiliary heating chamber positioned within the firebox and extending upward through the heat extraction chamber and located to the rear of the center of the said firebox and main heating chamber, said auxiliary heating chamber having connections independent of the connections of the main heating chamber and adapted to supply a heating medium at a higher temperature than that of the main heating chamber and a plurality of inwardly sloping tubes extending through the outer portion of the said heat extraction chamber and with both ends of the tubes opening into the said main heating chamber.

2. In a heating furnace of the type having a firebox, the combination of a main heating chamber surrounding the firebox and a heat extraction chamber above the firebox, and an auxiliary heating chamber positioned within the firebox and extending vertically upward through the heat extraction chamber and located to the rear of the center of the said firebox and main heating chamber, said auxiliary heating chamber having inlet and outlet connections independent of the connections of the main heating chamber, and a plurality of inwardly sloping tubes extending through the outward portion of the said heat extraction chamber and with both ends of the tubes opening into the said main heating chamber.

3. In combination, a heating furnace consisting of a firebox, a main heating chamber surrounding the firebox, a heat extraction chamber above the firebox, and a plurality of inwardly sloping tubes extending through the outer portion of the said heat extraction chamber above the firebox with their lower ends terminating at a point approximately at the top of the firebox and opening into the main surrounding chamber, and their upper ends extending through the top of the said heat extraction chamber and opening into said main surrounding chamber, and an auxiliary heating chamber positioned within the firebox extending vertically through the said heat extraction chamber and located to the rear of the center of the said firebox and main heating chamber, said auxiliary heating chamber having inlet and outlet connections independent of the connections of the main heating chamber.

In testimony whereof I affix my signature.

FRANK E. GRUNWALDT.